United States Patent [19]

Keene, Jr. et al.

[11] Patent Number: 4,951,306
[45] Date of Patent: Aug. 21, 1990

[54] X-RAY CASSETTES

[75] Inventors: Frank W. Keene, Jr., Fairport; Jeffrey C. Robertson, Rochester, both of N.Y.

[73] Assignee: Eastman Kodak Company, Rochester, N.Y.

[21] Appl. No.: 369,810

[22] Filed: Jun. 22, 1989

[51] Int. Cl.$^5$ .............................................. G03B 42/04
[52] U.S. Cl. .................................... 378/187; 378/185
[58] Field of Search ................................ 378/187, 185

[56]  References Cited
U.S. PATENT DOCUMENTS

| | | |
|---|---|---|
| 3,153,145 | 10/1964 | Yerkovich . |
| 3,504,180 | 3/1970 | Tone . |
| 3,958,125 | 5/1976 | Zechmair et al. . |
| 4,032,790 | 6/1977 | Nakamura . |
| 4,081,686 | 3/1978 | Nieuweboer . |
| 4,157,474 | 6/1979 | Koontz et al. . |
| 4,339,038 | 7/1982 | Bauer . |
| 4,350,248 | 9/1982 | Bauer . |
| 4,418,420 | 11/1983 | Bauer et al. . |
| 4,538,294 | 8/1985 | Tamura et al. . |
| 4,782,505 | 11/1988 | Ogo . |

Primary Examiner—Craig E. Church
Attorney, Agent, or Firm—John B. Turner

[57] ABSTRACT

A cassette for holding sheet film during exposure to x-radiation includes first and second hingedly connected panels. Both panels are curved substantially cylindrically when in the open condition, with the axes of the cylinders parallel to the hinge line and with the convexities facing one another. One of the panels is formed of carbon fiber reinforced plastics material and additionally, in some regions, deviates from the cylindrical by being curved towards the other panel, when in the open condition. Thus, while the cylindrical curvature is convex towards the other panel the regions of curvature out of the cylindrical exhibit some concavity towards the other panel. Such a panel improves the contact of the intensifying screens with the film and also the integrity of the light seal at the periphery of the cassette.

4 Claims, 5 Drawing Sheets

X-RAY CASSETTES

BACKGROUND OF THE INVENTION

This invention relates to x-ray cassettes intended for shielding sheet film from visible radiation and holding the film flat and in intimate contact with intensifying screens during exposure of the film to x-rays

DESCRIPTION RELATIVE TO THE PRIOR ART

X ray cassettes are known which comprise two rectangular panels which are connected by a hinge at one edge which allows the panels to be opened for the introduction of a sheet of film and closed for holding the film. The loading and unloading of the film is done in the dark and one of the purposes of the cassette is to shield the film from visible radiation until the cassette is returned to the dark and unloaded so that the film may be processed. Thus, while it is, of course, easy to make the panels of the cassette opaque to visible radiation but transparent to at least some degree to x radiation, attention must be given to sealing the peripheries of the panels against the intrusion of visible radiation. Another important role of the cassette is to maintain a complete intimate contact of intensifier screens with the sheet film when the cassette is closed. Those skilled in the art know that where an intensifier screen is spaced from the film, the image created in the film is blurred because light from a point on the screen spreads to an area on the film whereas with intimate contact the point source on the screen is imaged as a point on the film. For the purpose of gaining overall intimate contact, it is known to include resilient foam pads between a panel and its associated screen. The prior art shows that even the use of foam pads has not proved adequate for gaining the necessary overall intimate contact. U.S. Patent Specification No. 3,504,180 describes an x-ray film cassette in which the two panels are cylindrically curved, in the open condition of the cassette, with the axes of the cylinders being parallel to the hinge connecting the panels and with the panels being convex towards one another. The panels are formed of sheet aluminum and have light seals around their three edges other than the hinge edges. The hinge forms a light seal along the fourth edge.

While the cassette described in the aforementioned Patent Specification has been very successful commercially, the drive to reduce the dosage of x rays to which a patient is subjected during the taking of an image, has lead to the introduction of materials for cassette panels with even greater transparency to x radiation than aluminum. Carbon fiber reinforced plastics material, especially epoxy resin, has found commercial acceptance as a substitute for aluminum in the manufacture of at least that panel which is to be directed towards the source of x rays. It has been found that dosage may be reduced by as much as 80% when such a panel, rather than an aluminum panel, is used. However, a fiber reinforced plastics panel has a disadvantage when compared to an aluminum panel in that once it has been molded or cast, its shape cannot be modified. Even with the cylindrical aluminum panels, it has been found necessary to conduct an inspection of the integrity of the light seal around the periphery of the cassette. If at some location a lack of integrity was found, it has been practice to deform the panel or panels so that integrity is gained. Because the aluminum is ductile, the applied deformation is permanent. The fiber reinforced plastics panels are not susceptible to such a finishing operation to gain seal integrity, because they are not ductile. Tests of panels of both materials involving creation of images, show that there is room for improvement in gaining overall contact of the screens with the film. Failure to create a good light seal at the edges and failure to gain overall contact of the screens with the film are both derived from failure to create a panel which is planar and parallel to the other panel in the closed condition. It has been found that cassettes wherein one or both panels are formed of plastics material and have the cylindrical shape described in the aforementioned U.S. Patent Specification, there may be failure to gain the planarity and parallelism of the panels in the closed condition and this may appear as failure in the integrity of the light seal and/or failure to gain overall contact of the screens with the film and, because of the inability to deform a plastics panel in a finishing operation, such cassettes are useless.

It is an object of the present invention to overcome the light seal and overall screen contact problems in x-ray cassettes in which at least one panel is formed of plastics material.

SUMMARY OF THE INVENTION

The present invention solves the problem of the prior art by forming the plastics panel so that it not only exhibits the cylindrical form about an axis parallel to the hinge line and convex towards the other panel, but also is curved out of the cylindrical towards the other panel so that it has regions which exhibit some concavity towards the second panel. In mathematical terms this may be expressed as the panel having negative gaussian curvature. Such regions curved towards the other panel serve to ensure integrity of the light seal and continuity of contact of the screen with the film.

BRIEF DESCRIPTION OF THE DRAWINGS

An embodiment of the present invention will now be described, by way of example, with reference to the accompanying drawings, in which:

FIG. 1 of the accompanying drawings diagrammatically represents an X-ray cassette 20 in accordance with the present invention and in the open condition appropriate for the loading and unloading of a sheet of film (not shown in FIG. 1). The cassette 20 includes a first panel 22 and a second panel 24. The two panels 22 and 24 are generally rectangular and measure somewhat larger than 14 inches by 17 inches, which is the size of film which the presently described embodiment is intended to accommodate. The first panel 22 has long edges 22a and 22c and short edges 22b and 22d. The second panel 24 has long edges 24a and 24c and short edges 24b and 24d.

Figure 1:
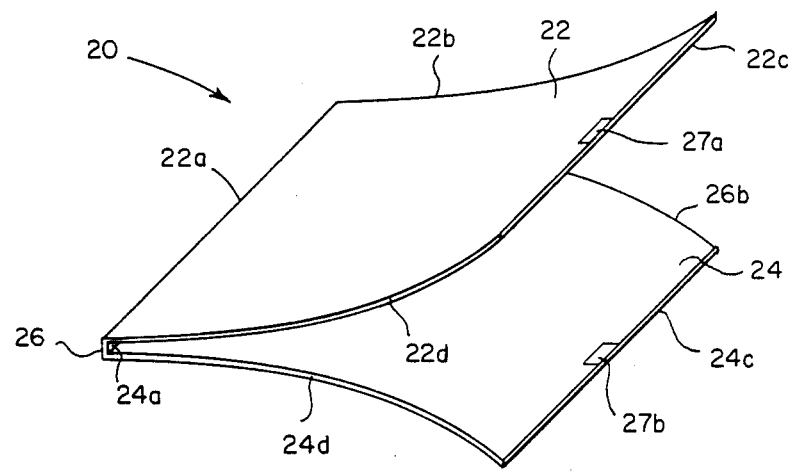
FIG. 1 is a diagrammatic representation of a cassette, in accordance with the present invention, in an open condition.

The panels 22 and 24 are connected by a hinge 26 at the edges 22a and 24a of the panels 22 and 24, respectively. The form of the hinge 26 will be described in detail subsequently herein. The hinge 26 allows the panels to be moved from an open position, as illustrated in FIG. 1, to a closed condition, and vice versa. Latch means 27a, 27b are provided at the middles of the edges 22c and 24c of the panels 22 and 24, respectively. The latch means 27a and 27b serve to releaseably retain the panels 22 and 24 in the closed condition.

Figure 2:
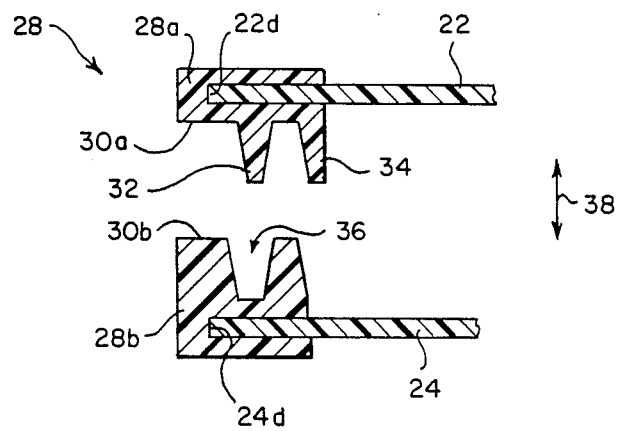
FIG. 2 is a scrap cross section of marginal portions of the panels of the cassette illustrated in FIG. 1, in a slightly opened condition, showing the edge light seal.

The edges 22b, 24b, 22d and 24d are provided with labyrinthine light seals 28, not illustrated in the diagrammatic representation which is FIG. 1, but which are shown in section in FIG. 2. The light seals 28 consist of a first part 28a on the first panel 22 and a second part 28b on the second panel 24. The seal parts 28a and 28b have outboard shoulder surfaces 30a and 30b, respectively, which bear against one another in the closed condition. Inboard from the shoulder surface 30a, the seal part 28a has two continuous ribs 32 and 34 which project towards the other seal part 28b. The other seal part 28b has a channel 36 adapted to receive the rib 32. The rib 34 of the first seal part 28a nests at the inboard edge of the seal part 28b in the closed condition. In FIG. 2 the seal parts are spaced and they approach and depart from one another for full closing and further opening by relative movement in the directions of the arrows 38. The seal parts 28a and 28b are formed on the margins of the panels 22, 24 by insert molding and, hence, are bonded to the panels. The seal parts 28a and 28b are formed of black opaque resilient plastics material.

Figure 3:
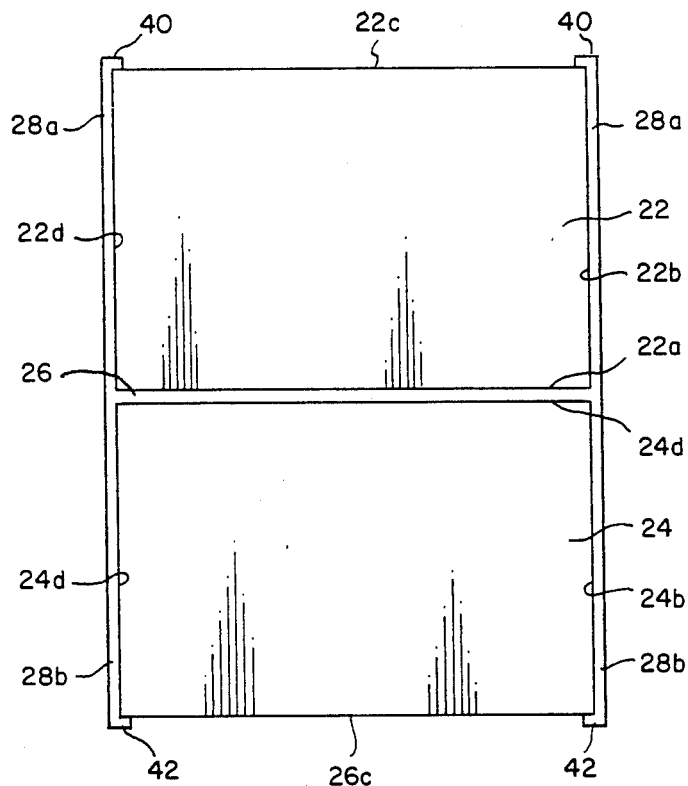
FIG. 3 is a plan view of the cassette illustrated in FIG. 1, with the panels in a fully open condition.

The insert molding step which forms the edge seal parts 28a and 28b also forms the hinge 26. Reference is now made to FIG. 3 of the accompanying drawings. For the insert molding step, the two panels 22 and 24 are held generally coplanar with the edges 22a and 24a adjacent but spaced from one another. The two seal parts 28a, the two edge seal parts 28b and the hinge are formed, by insert molding, as an integral H shaped whole. It will be observed that the edge seal parts 28a extend around the two corners of the panel 22 remote from the hinge 26, onto the side 22c, for a short distance, as indicated at 40. Similarly the edge seal parts 28b extend around the two corners of the panel 24 remote from the hinge 26, by a short distance, as indicated at 42.

Figure 4:
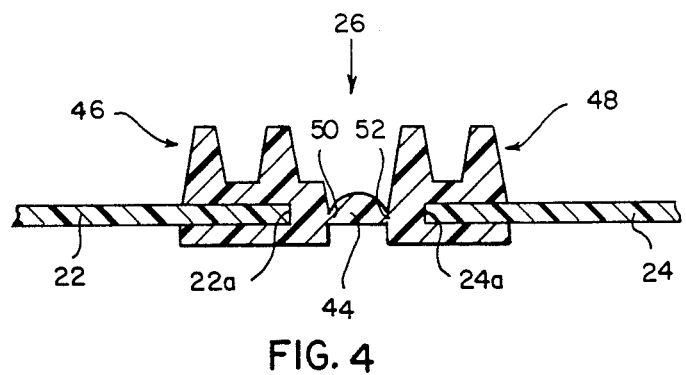
FIG. 4 is a scrap cross-section of the hinge connecting the two panels of the cassette illustrated in FIG. 1, with the panels in the fully open condition.

The form of the hinge 26 is illustrated in cross-section in FIG. 4. In essence, the hinge is a bridge 44 between continuations 46 and 48 of the seal parts 28a and 28b, respectively, along the edges 22a and 24a, respectively. The bridge is waisted at its two ends, as shown at 50 and 52, and it is at these waists that hinging occurs. The bridge 44 is continuous along the edges 22a and 22b and hence acts as a light seal when the panels 22 and 24 are in the closed condition. However, the continuations 46 and 48 of the seal parts 28a and 28b are provided in case a rupture should develop, after extensive use, in the waists 50 and 52.

Figure 5:
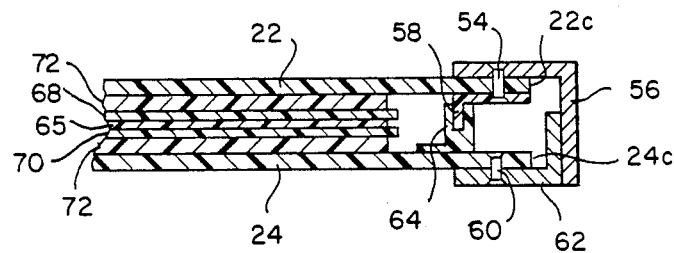
FIG. 5 is a scrap cross-sectional view of the margins of the panels opposite the hinge, of the cassette illustrated in FIG. 1, with the panels in the fully closed condition, illustrating reinforcing and light-sealing strips secured to the margins of the panels, and also illustrating intensifying screens and foam pressure pads and a film sheet.

Light sealing at the edges 22c and 24c, when the panels are in the closed condition, is provided as illustrated in FIG. 5. The first panel 22 has secured to it by rivets 54 an L-section strip 56 which extends substantially the full length of the edge 22c, to be contiguous at its ends with the continuations 40 of the edge seal parts 28a onto the edge 22c. A continuous labyrinthine light seal element 58, formed of black anodized aluminum, is secured to the inner surface of the panel 22, also by the rivets 54.

The second panel 24 has secured to it by rivets 60, an L section strip 62 which extends substantially the full length of the edge 24c, to be contiguous, at its ends, with the extensions 42 of the edge seal parts 28b onto the edge 24c. A continuous black anodized aluminum labyrinthine light seal element 64, complementary to the element 58 on the panel 22, is adhered to the inner surface of the panel 24.

The L-section strips 56 and 62 are formed of stainless steel and while they have stiffness they are not infinitely rigid. Not only do they serve as light seals, but also they serve as stiffeners, it being recognized that the latch means 27a, 27b are disposed at the middles of the edges 22c and 24c and are of short length relative to the edges 22c, 24c. Those skilled in the art know that a single latch has an advantage in that with two latches it is possible for the condition to occur in which one is latched and causes a casual observer to think that the cassette is properly closed and to assume that the light seal has good integrity. However, in truth, only one latch is latched and in the region of the other latch the seal integrity is bad and the film is fogged. Thus, the single latch has the advantage in that the cassette is either properly latched closed or it is not latched at all and a person loading the cassette in a darkroom cannot be fooled. However, because there is only a single latch and it is of cassette remote from the hinge, which are not retained together by a latch and hence, in such places the panels tend to be forced away from one another by the reaction pressure of the foam pads. The L-section strips are provided along the edges of the panels remote from the hinge to strengthen them and resist the divergence of the panels.

In FIG. 5 there is also illustrated diagrammatically, a film sheet 65 sandwiched between intensifier sheets 68 and 70. Between each intensifier sheet 68 or 70 and its associated panel 22 or 24, there is, in known fashion, a pressure pad 72. Each pressure pad 72 is in the form of a sheet of foamed resilient plastics material and serves to ensure intimate contact of the intensifier sheet 68 or 70, respectively, with the film sheet 65 when the cassette is in the closed condition.

Figure 6:
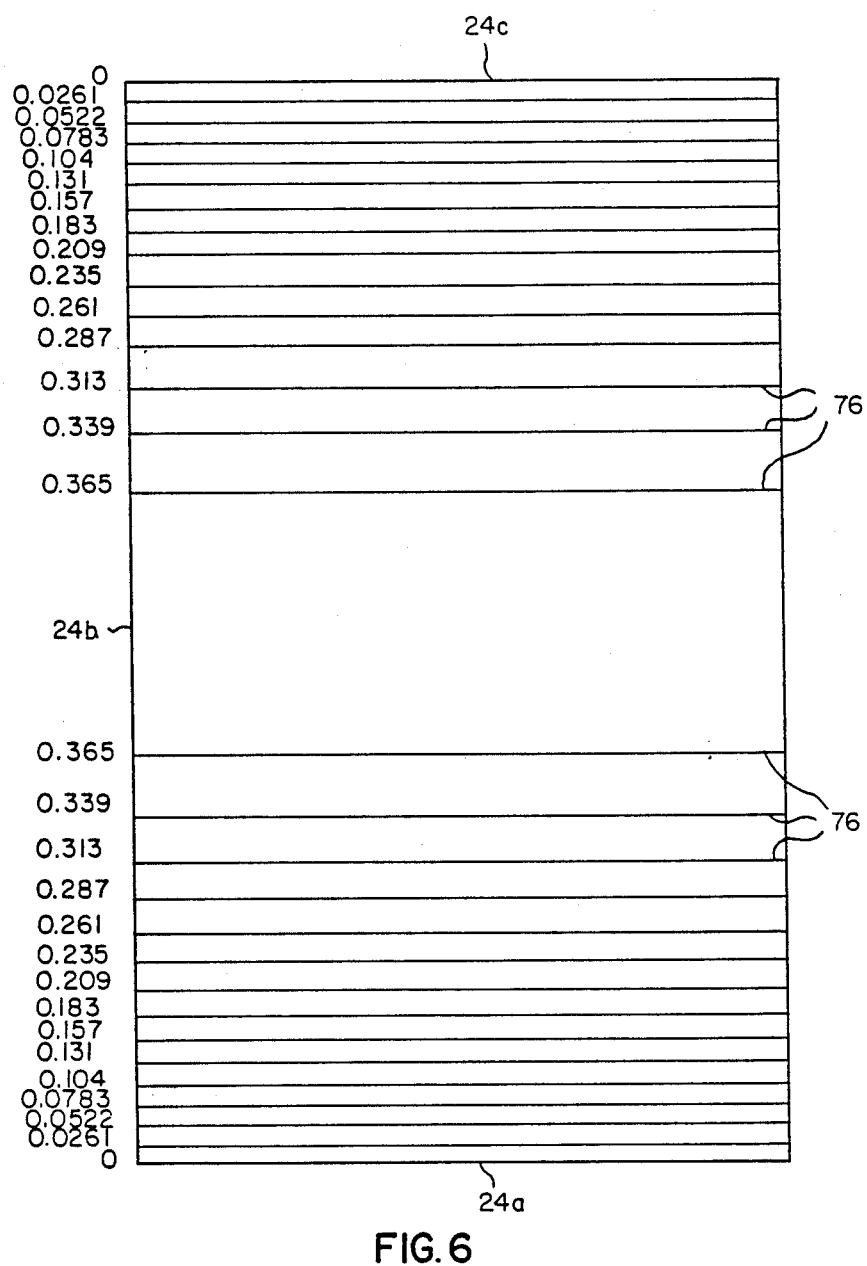
FIG. 6 is a plan view of half a panel in accordance with the prior art, which panel is cylindrically curved, with contour lines drawn thereon to indicate the shape of the panel.

The second panel 24 is of known form and consists of aluminum sheet. It is of generally cylindrical shape with the axis of the general cylindrical form being parallel to the hinge 26 and with the convexity of the generally cylindrical form facing the first panel 22. FIG. 6 is a plan view of half of the second panel 24 as seen from the concave side. The half which is represented in FIG. 6 is to the side of a line perpendicular to the axis of the hinge 26 and passing through points at the centers of the edges 24a and 24c. The panel 24 is symmetrical about that line. Drawn on the panel half are contour lines 76 representing the depth of the panel below a plane including the edges 24a and 24c. It will be recognized from the fact that the contour lines are all rectilinear that the panel 24 is cylindrical. The representation of the contours in FIG. 6 is appropriate for the panel in an open condition and before it has edge seals 28, the hinge 26 and the strip 62 and light seal element 64 associated with it.

The first panel 22 is formed of carbon reinforced plastics material which, for example, may be an epoxy or a polyetherimide. As is known, such panels have about one fifth the opacity to X-rays when compared to aluminum panels of similar mechanical strength.

Figure 7:
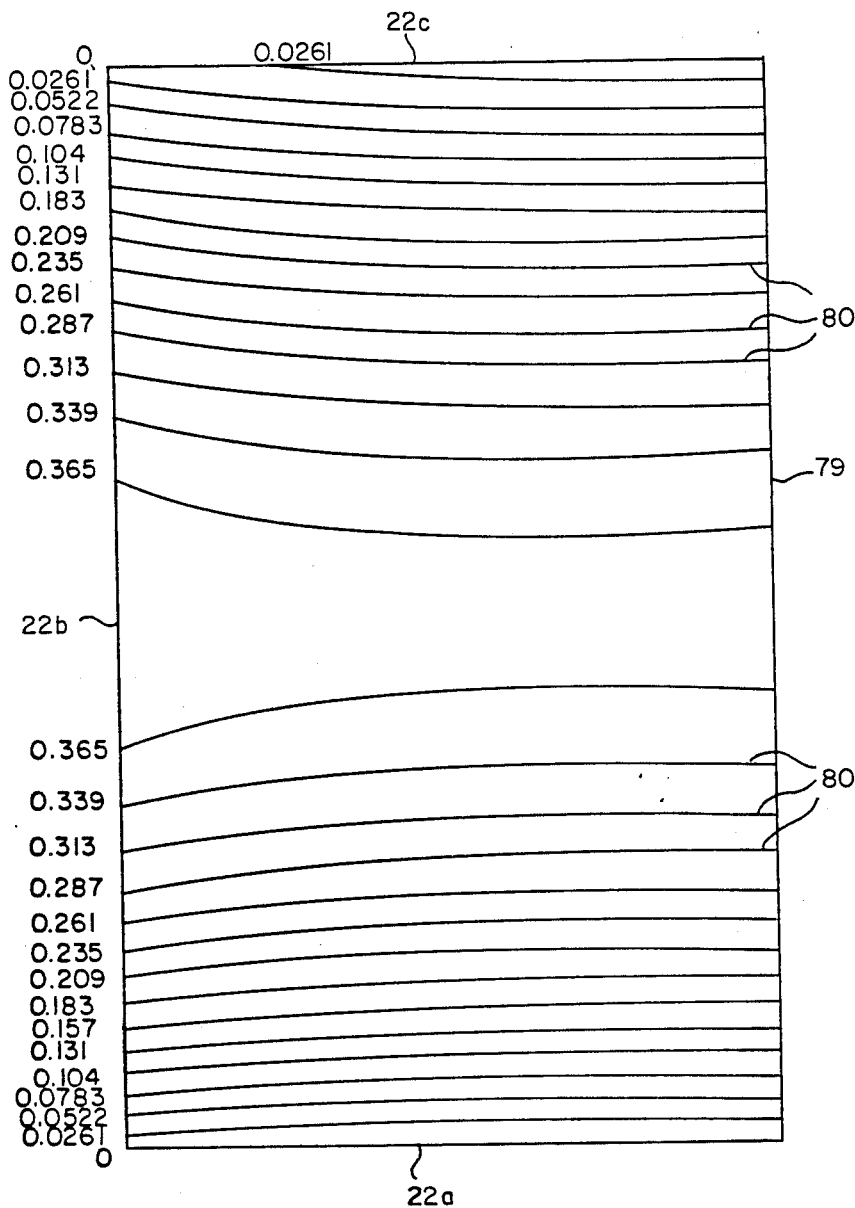
FIG. 7 is a view similar to that of FIG. 6 but illustrating a half of a panel in accordance with the present invention, again with contour lines drawn thereon.

FIG. 7 is a plan view, similar to that of FIG. 6, but showing a half of the first panel 22. In FIG. 7 also, only half the panel is illustrated, and again it is a half to the side of a line 79 perpendicular to the hinge and passing through the middles of the sides 24a and 24c. The panel is symmetrical about that line because, in the present embodiment, the latch means 27a and 27b are located at the middles of the sides 22c and 24c, respectively, of the panels 22 and 24, respectively. In FIG. 7 also, contour lines 80 are drawn on the outline of the half panel. Again, the contours are appropriate for the panel 22 before the application of edge seal parts 28a, hinge 26 and strip 56 and sealing element 58. It will be observed that the first contour line immediately adjacent the edge 22a, which is the edge at which the hinge will be formed, is substantially rectilinear and parallel to the edge 22a. Thus, immediately adjacent the edge 22a the curvature of the panel 22 is substantially cylindrical. It will also be observed that the further from the edge 22a towards the middle of the panel, so the contour lines 80 bend more adjacent the edge 22b. It will be seen that adjacent the center line 79 the contour lines are substantially rectilinear and parallel which indicates that along the center line 79 the curvature of the panel is substantially purely cylindrical. That cylindrical form is, of course, concave to the viewer of FIG. 7, that is, the cylindrical curvature is convex to the other panel 22. The curved form of the contour lines 80 as they approach the side 22b, with the contour lines being closer to one another at the edge 22b than at the center line 79, with a bigger space between the two 0.365 contour lines at the edge 22b than at the center line 79, indicates that there is convexity of the panel, towards the viewer of FIG. 7, superimposed on the overall concavity resulting from the cylindrical curvature of the panel. In other words, the surface of the panel drops away from a line perpendicular to the center line 79 and parallel to the surface of the panel at the center line 79, progressively as the distance from the center line increases. Thus, it may be said that the first panel has regions which depart from the cylindrical and are curved out of the cylindrical towards the other, second panel, the said regions exhibiting some concavity towards the second panel. It may also be said that the panel exhibits negative gaussian curvature, with a few areas of positive, when the panel is in a cassette and in the open condition.

The shape of the panel 22, which is represented by the contour lines in FIG. 7, was arrived at by computer modeling techniques. In essence, it was assumed that two panels of similar material and cylindrical curvature and hinged at one edge, were closed on one another and held together by a latch at the middle of the edges opposite the hinge edge. The computer was used to show where there would be deviation of the panels from the planar and parallel condition, and the magnitude of such deviation. Such deviation would, of course, in real life, translate into gaps between the shoulders 30a and 30b of the light seals and, possibly, lack of contact of the screens with the film. The computer was then caused to, in the model, deform each panel by a dimension equal to the dimension of the deviation, at each point on the facing surfaces of the panels. An iterative process was instituted, with the computer again closing the panels, in the model, and again measuring the deviations. It was found that only two such iterations were needed to arrive at a shape for the panels which resulted in good light sealing and screen contact. In this computer modeling technique, the effects of the pressure pads 72, 74 which, being compressed when the cassette is closed, exert pressures on the panels tending to deform the panels at locations other than immediately adjacent the hinge and the latch, was also taken into account. Also taken into account were the effects of the strips 56 and 62, the light sealing elements 58 and 64 and the light seals 28.

As stated above, the computer modeling procedure assumed two identical panels. In the embodiment particularly described above, one panel is formed of fiber reinforced plastics material and the other is formed of aluminum. The use of different materials for the panels is because the fiber-reinforced plastics material is many times more expensive than aluminum and, while its expense can be justified for the panel which is to be towards the x-ray source, its expense cannot be justified for the other panel. Thus, the two panels are not identical in materials. However, the fiber-reinforced plastics material was chosen to have a stiffness approximating that of the aluminum panel. Thus, in the embodiment particularly described above, there is one panel, the plastics panel, which might be regarded as having a perfect shape, and the other panel, the aluminum panel, has the cylindrical shape, which is less than perfect but may in many actual embodiments, lead to adequate light sealing and uniformity of screen contact. If there are any light leaks, the technique used heretofore as a finishing step in the manufacture of cassettes with two aluminum panels, may be adopted. That technique is bending the aluminum panel in any area where a gap exists between the intended-to-be-mating shoulders 30a and 30b of the light seals 28. It will be recognized by those skilled in the art, that the carbon fiber reinforced plastics panel cannot be permanently deformed after it has been cured, thus it is not susceptible to the finishing step performed on aluminum panels.

In other embodiments of the present invention, for example when cost is not a consideration, both the panels may be formed of a reinforced plastics material and in such embodiments, both panels would be similar to the first panel specifically described above, and exhibit negative gaussian curvature.

As is well known to those skilled in the art, there are many different sizes of x-ray cassettes. The shape of a panel in accordance with the invention will be different for each size and, of course, will depend on whether the hinge is on a long or a short side of a rectangular cassette. Also, the shape will vary according to the material chosen for the panel and for the strips along the latch edges of the panels and for the light seals. However, the principles of the computer modeling techniques described above may be adopted in all cases. Details of the modeling techniques are not described herein because they are believed to be within the skill of people skilled in the art of computer modeling.

The invention has been described in detail with particular reference to presently preferred embodiments, but it will be understood that variations and modifications can be effected within the spirit and scope of the invention.

What is claimed is:

1. A cassette for holding sheet film during exposure to X-radiation, comprising:
    a first panel intended to face towards a source of X-rays and formed of fiber-reinforced plastics material;
    a second panel intended to face away from the source of X-rays;
    hinge means connecting said first and second panels for movement between an open condition in which a film sheet may be disposed between the panels, and a closed condition in which the panels overlie one another and the film sheet is disposed between the panels;
    latch means associated with the panels for releaseably securing the panels in the closed condition, said latch means being disposed at the middles of the sides of the panels opposite said hinge means;
    intensifying screens associated one with each of said panels;
    a pad of resilient material between each of said intensifying screens and its associated panel;
    both said panels being so formed that when in the open condition each exhibits generally cylindrical curvature about an axis parallel to said hinge with their convex surfaces facing one another;
    said first panel having regions departing from the cylindrical and being curved out of the cylindrical towards the other panel, whereby while the cylindrical curvature is convex towards the second panel, the said regions exhibit same concavity towards the second panel.

2. A cassette as claimed in claim 1, wherein said first panel is formed of epoxy material reinforced with carbon fibers.

3. A cassette as claimed in claim 1 or 2, wherein both said panels are formed of fiber reinforced plastics material and said second panel also has regions departing from the cylindrical and being curved out of the cylindrical towards the other panel, whereby while the cylindrical curvature is convex towards the first panel, the said regions exhibit some concavity towards the second panel.

4. A cassette as claimed in claim 3, wherein said second panel is formed of fiber-reinforced plastics material.

* * * * *